(12) United States Patent
Hotto

(10) Patent No.: US 7,520,350 B2
(45) Date of Patent: Apr. 21, 2009

(54) SYSTEM AND METHOD FOR EXTRACTING PROPULSION ENERGY FROM MOTOR VEHICLE EXHAUST

(75) Inventor: Robert Hotto, 1005 Goldeneye View, Carlsbad, CA (US) 92009

(73) Assignee: Robert Hotto, Carlsbad, CA (US)

( * ) Notice: Subject to any disclaimer, the term of this patent is extended or adjusted under 35 U.S.C. 154(b) by 365 days.

(21) Appl. No.: 10/994,957

(22) Filed: Nov. 22, 2004

(65) Prior Publication Data

US 2006/0108160 A1 May 25, 2006

(51) Int. Cl.
*B60K 6/08* (2006.01)

(52) U.S. Cl. .............. 180/65.2; 180/309; 903/908; 903/944

(58) Field of Classification Search ......... 180/309, 180/65.2, 65.22; 903/908, 944
See application file for complete search history.

(56) References Cited

U.S. PATENT DOCUMENTS

| | | | |
|---|---|---|---|
| 4,119,862 A | 10/1978 | Gocho | |
| 4,722,303 A | 2/1988 | Leonhard | 123/3 |
| 5,002,020 A | 3/1991 | Kos | 123/46 E |
| 5,785,136 A | 7/1998 | Falkenmayer | 180/65.2 |
| 6,098,733 A * | 8/2000 | Ibaraki et al. | 180/65.2 |
| 6,105,697 A | 8/2000 | Weaver | 180/65.3 |
| 6,209,672 B1 | 4/2001 | Severinsky | 180/65.2 |
| 6,213,234 B1 | 4/2001 | Rosen | 180/65.3 |
| 6,338,391 B1 | 1/2002 | Severinsky | 180/65.2 |
| 6,367,570 B1 | 4/2002 | Long | 180/65.8 |
| 6,458,478 B1 * | 10/2002 | Wang et al. | 429/17 |
| 6,536,547 B1 | 3/2003 | Meaney | 180/65.2 |
| 6,541,876 B2 | 4/2003 | Shimizu | 290/40 A |
| 6,554,088 B2 | 4/2003 | Severinsky | 180/65.1 |
| 6,581,705 B2 | 6/2003 | Phillips | 180/65.2 |
| 6,609,582 B1 * | 8/2003 | Botti et al. | 180/65.3 |
| 6,621,175 B1 | 9/2003 | Kuroda | 290/40 D |
| 6,641,625 B1 | 11/2003 | Clawson | 48/127.9 |
| 6,659,213 B2 | 12/2003 | Kubo | 180/65.3 |
| 6,664,651 B1 | 12/2003 | Breida | 290/29 |
| 6,672,415 B1 * | 1/2004 | Tabata | 180/65.2 |
| 6,701,229 B2 * | 3/2004 | Iwasaki | 701/22 |
| 6,715,452 B1 | 4/2004 | Taylor | 123/3 |
| 6,736,229 B1 | 5/2004 | Amori | 180/69.5 |
| 6,808,145 B2 | 10/2004 | Burton | 244/172 |
| 6,817,182 B2 | 11/2004 | Calwson | 60/670 |
| 6,819,985 B2 | 11/2004 | Minagawa | 701/22 |
| 6,827,047 B2 * | 12/2004 | Qian et al. | 123/3 |
| 6,837,702 B1 | 1/2005 | Shelor et al. | |
| 6,908,700 B2 * | 6/2005 | Iio | 429/17 |

(Continued)

OTHER PUBLICATIONS

Web Page entitled: "Onboard Generation of Hydrogen-Rich Gaseous Fuels- A Review" Sep. 2000.

(Continued)

*Primary Examiner*—Christopher P Ellis
*Assistant Examiner*—John D Walters
(74) *Attorney, Agent, or Firm*—Cooley Godward Kronish LLP

(57) ABSTRACT

Vehicle engine exhaust is sent to a reformer, which produces hydrogen from fuel remaining in the exhaust. The hydrogen is stored in a hydrogen tank, and is used by a fuel cell to produce electricity to recharge the vehicle battery and/or to supply propulsion current to an electric propulsion system to propel the vehicle in lieu of using the engine.

27 Claims, 1 Drawing Sheet system

U.S. PATENT DOCUMENTS

| | | | |
|---|---|---|---|
| 7,147,072 B2* | 12/2006 | Botti | 180/65.3 |
| 2004/0053087 A1* | 3/2004 | Akikusa et al. | 429/20 |
| 2006/0063046 A1* | 3/2006 | Hu et al. | 429/17 |
| 2006/0180362 A1* | 8/2006 | Yamaguchi et al. | 180/65.2 |

OTHER PUBLICATIONS

Future Power Systems Group Power Point Presentation entitled: "Hydrogen from Exhaust Gas Fuel Reforming: Greener, Leaner and Smoother Engines".

"IV.B. Onboard Plasmatron Hydrogen Production for Improved Vehicles", Heavy Vehicle Systems Optimization Program FY 2005 Annual report pp. 133-137.

L. Bromberg et al. "Onboard Plasmatron Generation of Hydrogen Rich Gas for Diesel Aftertreatment and Other Application", Diesel Engine Emissions Reduction (DEER) Meeting Aug. 2002, pp. 1-20.

"Hydrogen Fact Sheet, Hydrogen Production—Steam Methane Reforming (SMR)" at www.getenergysmart.org.

"Water Gas Shift Reaction," at www.wikipedia.org/wiki/Hydrogen_reformer.

"Steam Reforming," at www.wikipedia.org/wiki/Water_shift_reaction.

* cited by examiner vehicle system

SYSTEM AND METHOD FOR EXTRACTING PROPULSION ENERGY FROM MOTOR VEHICLE EXHAUST

FIELD OF THE INVENTION

The present invention relates generally to motor vehicles.

BACKGROUND OF THE INVENTION

The importance of energy conservation goes without saying. Not only must fossil fuels be conserved for future use, but limiting the amount of fossil fuels that must be burned appears to be highly beneficial for the environment. However, many proposals for improving vehicle energy consumption efficiency cannot be realistically implemented any time soon. Hence, the present invention.

SUMMARY OF THE INVENTION

A vehicle has an internal combustion engine that includes an exhaust pipe. The vehicle also has a drive train which is couplable to the engine and an electric propulsion system that likewise is couplable to the drive train. The vehicle may also include a battery. The invention in one aspect includes a reformer connected to the exhaust pipe for producing hydrogen from exhaust gases from the engine. A hydrogen tank can store the hydrogen for use thereof by a fuel cell to produce electricity to recharge the battery and/or to supply propulsion current to the electric propulsion system.

In some implementations a controller selectively causes the electric propulsion system or the engine to activate the drive train. A valve may be interposed in a fluid path between the hydrogen tank and fuel cell, and the controller can control the valve to open and close the fluid path based at least in part on an amount of hydrogen in the hydrogen tank. Further, if desired a switch may be interposed in an electrical path between the fuel cell and electric propulsion system, with the controller controlling the switch. Also, if desired a controller-controlled switch can be interposed in an electrical path between the battery and electric propulsion system, and yet another controller-controlled switch may be interposed in an electrical path between the battery and fuel cell.

In another aspect, a method for activating a vehicle drive train to propel a vehicle includes providing an internal combustion engine couplable to the drive train, and providing an electric propulsion system that is also couplable to the drive train. Electricity is generated using exhaust gas of the engine to recharge a battery which is connectable to the electric propulsion system, and/or to provide propulsion current to the electric propulsion system.

In still another aspect, a vehicle propulsion system includes internal combustion means for producing torque to actuate a drive train, and electric drive means for producing torque to actuate the drive train. Means are provided for producing electricity using hydrogen gleaned from an exhaust of the internal combustion means.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
FIG. 1 is a schematic representation of a motor vehicle.

FIG. 1 shows a motor vehicle 10 that may use the present propulsion system to cause one or more wheels 12 to rotate and move the vehicle 10. The vehicle 10 may be an automobile, truck, motorcycle, or other wheeled vehicle. The present principles also apply to non-wheeled vehicles including boats, aircraft, or other vehicles that use an internal combustion engine.

Figure 2:
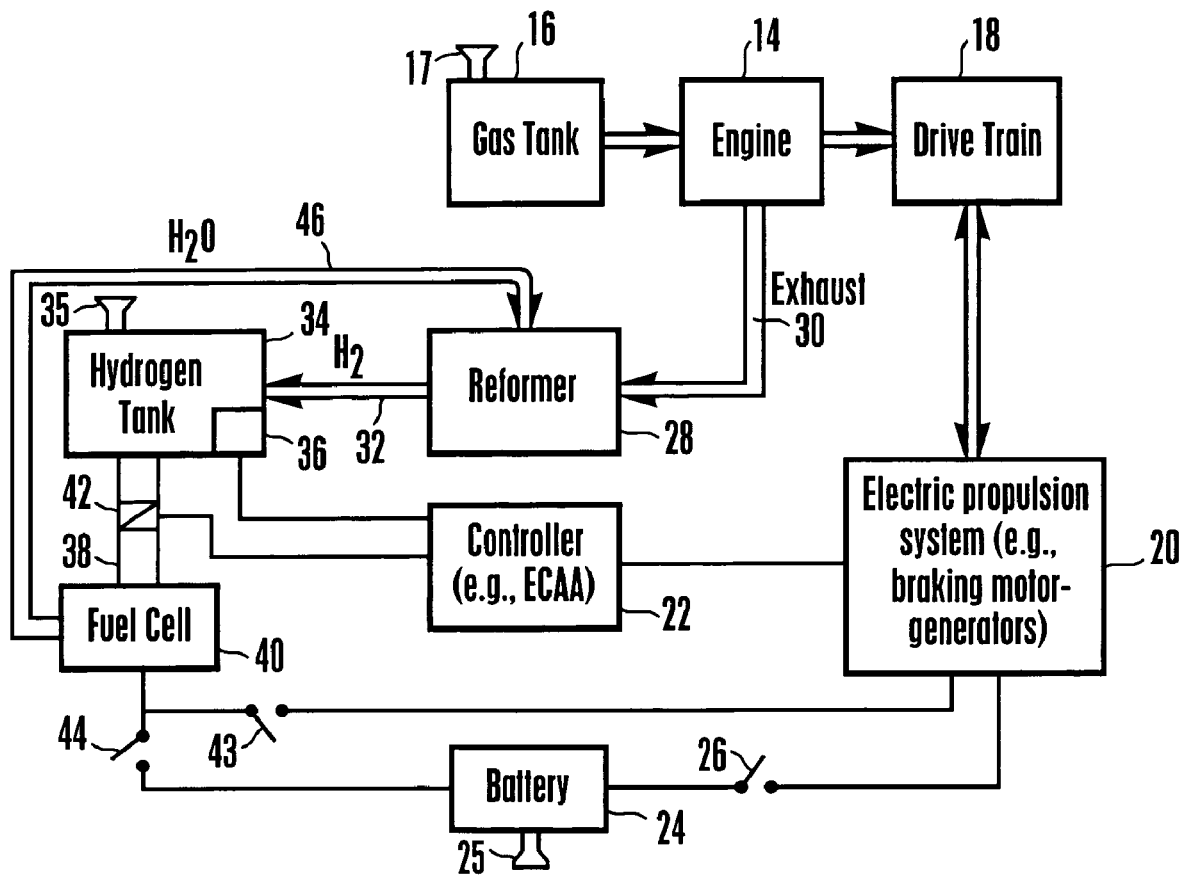
FIG. 2 is a block diagram of the present system, with double lines indicating mechanical couplings and single lines indicating electrical connections.

FIG. 2 shows that the present propulsion system includes an internal combustion engine 14 that can be a four stroke (e.g., gasoline) engine or two stroke (e.g., diesel) engine. The engine 14 receives hydrocarbon fuel from a gas tank 16 (that can be filled at a service station with gas through a filler pipe 17), and the engine outputs torque to a drive train 18 that can include a combination of components known in the art, e.g., crankshafts, transmissions, axles, and so on.

Additionally, the propulsion system can include an electrical propulsion system 20 such as braking motor-generators, sometimes referred to as "regenerators", in accordance with hybrid vehicle principles known in the art. Briefly, braking motor-generators work in response to signals that can be sent from a controller 22, such as might be implemented in an engine control module (ECM). When a brake pedal is depressed by a driver, the ECM activates the braking motor generators (by, e.g., supplying field current to them), which act as electro-magnetic brakes in cooperation with complementary structure on the wheels or axle or other part of the drive train 18 to slow the vehicle down. In this mode, the braking motor-generators act as generators, outputting electricity to a vehicle battery 24 through a main battery switch 26 that is controlled by the controller 22 to shut the switch. If desired, the battery 24 also can be recharged at a service station through a recharging line 25. On the other hand, the controller 22, which also controls the engine 14, can cause the engine 14 to stop and/or to be disengaged from the drive train 18 to conserve fuel, and instead cause the battery 24 to supply propulsion power through the switch 26 to the braking motor-generators, which act as motors to cause the complementary structure in the drive train 18 to turn.

The controller 22 may be implemented by any suitable processing apparatus, including a digital signal processor (DSP) or computer microprocessor, to execute the logic set forth further below. The logic below may be implemented by plural controllers.

Thus far, a so-called "hybrid" vehicle has been described. In accordance with the present invention, however, in addition to the power sources discussed above, the exhaust from the engine 14 is supplied to a reformer 28 through an exhaust pipe 30. According to reformer principles known in the art, the reformer 28 produces hydrogen from the exhaust gases, e.g., from unburnt fuel that remains in the engine exhaust. As critically recognized herein, the exhaust from the engine is hot, facilitating performance of the reformer 28.

Hydrogen from the reformer 28 is directed through a hydrogen line 32 to a hydrogen tank 34 for storage. If desired, in addition to receiving hydrogen from the reformer 28, the hydrogen tank 34 can be filled at a service station with hydrogen through a filler pipe 35. The hydrogen tank 34 may include a detector 36 that generates an electrical signal representative of the amount of hydrogen in the tank, and this signal may be sent to the controller 22. Hydrogen from the tank 34 can be supplied through a fuel cell line 38 to a fuel cell 40, which uses the hydrogen to generate electricity in accordance with fuel cell principles known in the art. A valve 42 such as a solenoid valve may be controlled by the controller 22 in accordance with logic below to selectively block or unblock the fuel cell line 38. Water can be returned from the fuel cell 40 if desired to the reformer 28 through a water line 46.

Further, the present invention recognizes that the exhaust gas that remains after being stripped of hydrogen in the reformer 28 possesses newly exposed carbon bonds, and consequently may be recycled back to the engine 14 from the reformer 28 for further combustion.

As shown in FIG. 2, the fuel cell 40 can output propulsion current to the electric propulsion system 20 through a fuel cell switch 43, which is controlled by the controller 22. Also, if desired the fuel cell 40 can output recharging current to the battery 24 through a recharging switch 44, which is controlled by the controller 22 to recharge the battery 24. In some implementations the fuel cell 40 can output current directly to the electrical propulsion system 20 as shown as well as to the battery 24, or it may output current only to the electrical propulsion system 20, or it may output only recharging current to the battery 24.

The switches discussed above may be electro-mechanical or electrical, e.g., they may be implemented by field effect transistors (FET).

With the above system architecture in mind, the controller 22 can cause the drive train to be powered by the engine 14, with the reformer 28 producing hydrogen for storage in the hydrogen tank 34 and with the switches 26, 43, 44 open and valve 42 shut. If the controller 22 determines that the state of charge of the battery 24 and operational mode (including demanded speed, etc.) of the vehicle 10 warrant it, the controller 22 can decouple the engine 14 from the drive train 18 and close the battery switch 26 cause the battery 24 to supply propulsion current to the electric propulsion system 20.

Yet again, regardless of whether the battery 24 can be used in the particular implementation to propel the vehicle, the controller 22 can, when conditions warrant and the amount of hydrogen in the hydrogen tank 34 indicates a sufficient amount of hydrogen, cause the valve 42 to open. This ports hydrogen to the fuel cell 40, which outputs electricity. The controller 22 may cause the recharging switch 44 to close to recharge the battery 24 from the fuel cell 40, and/or it may case the fuel cell switch 43 to close to send propulsion current to the electric propulsion system 20 (in which case the engine 14 would be decoupled from the drive train 18).

While the particular SYSTEM AND METHOD FOR EXTRACTING PROPULSION ENERGY FROM MOTOR VEHICLE EXHAUST as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more". It is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. Absent express definitions herein, claim terms are to be given all ordinary and accustomed meanings that are not irreconcilable with the present specification and file history.

I claim:

1. A vehicle having an internal combustion engine including at least one exhaust pipe, a drive train couplable to the engine, an electric propulsion system couplable to the drive train, and at least one battery, comprising:
   at least one reformer connected to the exhaust pipe for producing hydrogen from hydrocarbons in the exhaust gases from the engine;
   at least one hydrogen tank for storing the hydrogen; and
   at least one fuel cell connected to the hydrogen tank for using the hydrogen to produce electricity to recharge the battery, supply propulsion current to the electric propulsion system, or recharge the battery and supply propulsion current to the electric propulsion system.

2. The vehicle of claim 1, wherein the electricity from the fuel cell is propulsion current supplied to the electric propulsion system to activate the drive train to propel the vehicle.

3. The vehicle of claim 1, wherein the electricity from the fuel cell is recharging current supplied to the battery to recharge the battery.

4. The vehicle of claim 1, comprising at least one controller selectively causing the electric propulsion system or the engine to activate the drive train.

5. The vehicle of claim 4, comprising at least one valve interposed in a fluid path between the hydrogen tank and fuel cell, wherein the controller controls the valve to open and close the fluid path based at least in part on an amount of hydrogen in the hydrogen tank.

6. The vehicle of claim 5, comprising at least one switch interposed in an electrical path between the fuel cell and electric propulsion system, the controller controlling the switch.

7. The vehicle of claim 5, comprising at least one switch interposed in an electrical path between the battery and electric propulsion system, the controller controlling the switch.

8. The vehicle of claim 5, comprising at least one switch interposed in an electrical path between the battery and fuel cell, the controller controlling the switch.

9. A method for providing energy to propel a vehicle, comprising:
   providing an internal combustion engine couplable to a drive train;
   providing an electric propulsion system couplable to the drive train; and
   generating electricity at least in part using hydrocarbons in the exhaust gas of the internal combustion engine to undertake at least one of:
   recharge a battery connectable to the electric propulsion system, and
   provide propulsion current to the electric propulsion system; wherein said generating includes sending the exhaust gas to a reformer and providing hydrogen from the reformer to a fuel cell operative to generate at least a portion of the electricity.

10. The method of claim 9, comprising storing hydrogen from the reformer until such time as it is determined to produce electricity using the fuel cell, and then sending hydrogen to the fuel cell.

11. The method of claim 9, wherein the act of generating produces propulsion current for the electric propulsion system.

12. The method of claim 9, wherein the act of generating produces recharging current for the battery.

13. A vehicle propulsion system, comprising:
internal combustion means for producing torque;
electric drive means for producing torque; and
means for producing electricity using hydrogen gleaned from a reformer disposed to receive at least a portion of the hydrocarbons in an exhaust stream of the internal combustion means.

14. The system of claim 13, wherein the means for producing electricity generates propulsion current that is sent directly to the electric drive means.

15. The system of claim 13, wherein the means for producing electricity generates recharging current that is used to recharge at least one battery.

16. The system of claim 13, wherein the means for producing electricity includes at least one fuel cell receiving hydrogen and producing electricity.

17. The system of claim 13, wherein the means for producing electricity includes at least one tank interposed between the reformer and the fuel cell; said tank configured to store hydrogen.

18. The system of claim 17 wherein the tank is connected directly to a hydrogen output of the reformer.

19. In a vehicle having an internal combustion engine including at least one exhaust pipe, a drive coupleable to the engine, an electric propulsion system coupleable to the drive, and at least one battery, a combination comprising:
a reformer connected to the exhaust pipe for producing hydrogen from hydrocarbons in the exhaust gases from the engine;
a tank for storing the hydrogen; and
a fuel cell connected to the tank for using the hydrogen to produce electricity to recharge the battery, supply propulsion current to the electric propulsion system, or produce electricity to recharge the battery and supply propulsion current to the electric propulsion system.

20. The combination of claim 19 further comprising a channel for providing water directly from the fuel cell to the reformer.

21. The combination of claim 19 further comprising a controller to receive a fuel supply signal from a detector on the tank and provide a signal to a valve to regulate fuel flow between the tank and the fuel cell.

22. The combination of claim 19 further comprising a channel for providing at least a portion of the exhaust gas output from the reformer to the internal combustion engine to provide additional fuel to the engine.

23. The combination of claim 21 further comprising at least one switch connected to the controller for switching the battery output between the fuel cell and the electric propulsion system.

24. The vehicle of claim 1 further configured to apply at least a portion of said exhaust gases to heat said reformer to improve the hydrogen conversion performance of said reformer.

25. The vehicle of claim 1 wherein said internal combustion engine is a two-stroke engine.

26. The vehicle of claim 1 wherein said internal combustion engine is a four-stroke engine.

27. A method for propelling a vehicle, comprising:
providing an internal combustion engine configured to be couplable to a drive train of said vehicle;
providing an electric propulsion system configured to be couplable to the drive train, said electric propulsion system including a fuel cell;
providing exhaust gases from said internal combustion engine to a reformer, wherein said exhaust gases include unburned hydrocarbons;
heating said reformer using said exhaust gases;
converting at least a portion of said unburned hydrocarbons to hydrogen in said reformer;
providing said hydrogen to a storage tank; and
providing said hydrogen stored in said storage tank to one of said fuel cell or said internal combustion engine as a fuel to facilitate propelling said vehicle.

* * * * *